US012129071B2

(12) United States Patent
Hansen

(10) Patent No.: US 12,129,071 B2
(45) Date of Patent: Oct. 29, 2024

(54) APPARATUS FOR LINE PRODUCTION OF PLANT GROWTH MEDIUM POTS OR BAGS

(71) Applicant: Ellepot A/S, Esbjerg N (DK)

(72) Inventor: Lars Peter Bilde Hansen, Vejen (DK)

(73) Assignee: Ellepot A/S, Esbjerg N (DK)

( * ) Notice: Subject to any disclaimer, the term of this patent is extended or adjusted under 35 U.S.C. 154(b) by 791 days.

(21) Appl. No.: 17/266,757

(22) PCT Filed: Jul. 31, 2019

(86) PCT No.: PCT/EP2019/070629
§ 371 (c)(1),
(2) Date: Feb. 8, 2021

(87) PCT Pub. No.: WO2020/030495
PCT Pub. Date: Feb. 13, 2020

(65) Prior Publication Data
US 2021/0309399 A1    Oct. 7, 2021

(30) Foreign Application Priority Data
Aug. 10, 2018    (DK) .......................... PA 2018 00453

(51) Int. Cl.
*B65B 37/00* (2006.01)
*A01G 9/029* (2018.01)
(Continued)

(52) U.S. Cl.
CPC .............. *B65B 9/20* (2013.01); *A01G 9/0291* (2018.02); *A01G 9/081* (2013.01); *B65B 9/2014* (2013.01);
(Continued)

(58) Field of Classification Search
CPC ....... B65B 9/20; B65B 9/2014; B65B 9/2056; B65B 9/213; B65B 31/024; B65B 37/06;
(Continued)

(56) References Cited

U.S. PATENT DOCUMENTS 3,040,490 A * 6/1962 Virta .......................... B65B 1/28
53/434
3,807,125 A * 4/1974 Enrich ...................... B65B 9/20
53/450
(Continued)

FOREIGN PATENT DOCUMENTS

CA    2082126 A1    5/1994
EP    0848903 A1    6/1998
(Continued)

OTHER PUBLICATIONS

International Search Report for PCT/EP2019/070629 dated Nov. 11, 2019.

*Primary Examiner* — Stephen F. Gerrity
(74) *Attorney, Agent, or Firm* — Morse, Barnes-Brown & Pendleton, P.C.; Sean D. Detweiler, Esq.

(57) ABSTRACT

A process for line production of plant growth medium pots or bags with a closed bottom end includes the steps of: i) continuously folding the free end of a continuous length of water and air permeable sheet material into a sheet material tube around and beyond a free end of a growth medium feeding tube; ii) forming a first sealing in the sheet material tube; iii) filling the sheet material tube with a measured amount of growth medium; iv) forming a second sealing in the sheet material tube; v) separating the part of the sheet material tube positioned downstream from the second sealing to form a first plant growth medium pot or bag with a closed end, repeating as needed to form a plurality of plant growth medium pots or bags.

3 Claims, 5 Drawing Sheets

Figure 1:
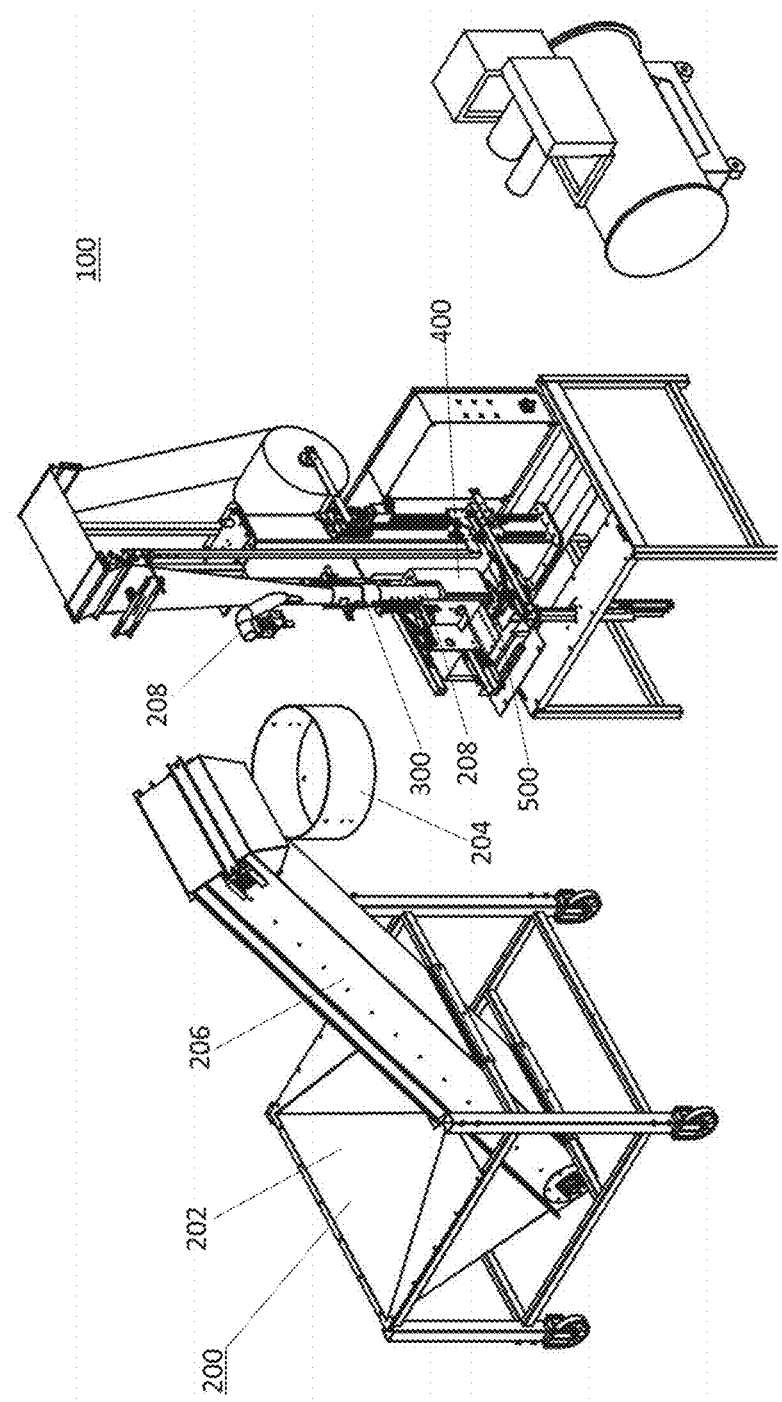
Figure 2:
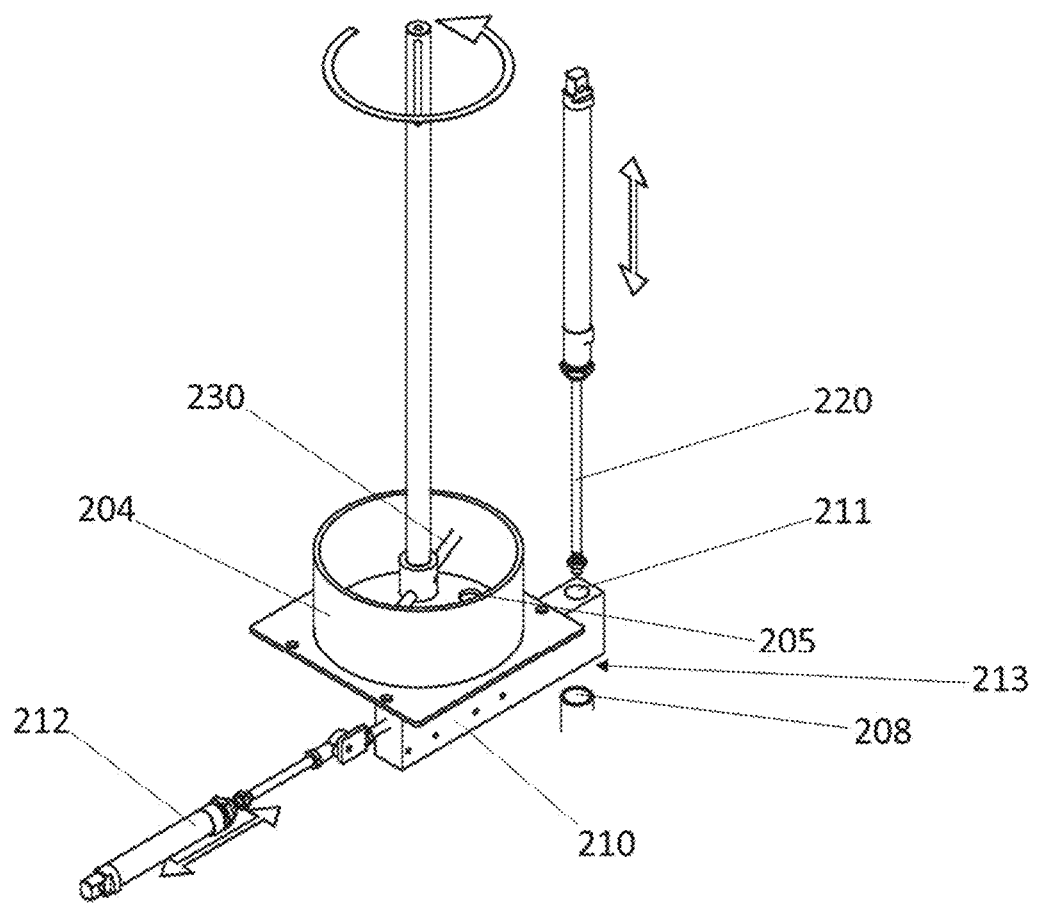
Figure 3:
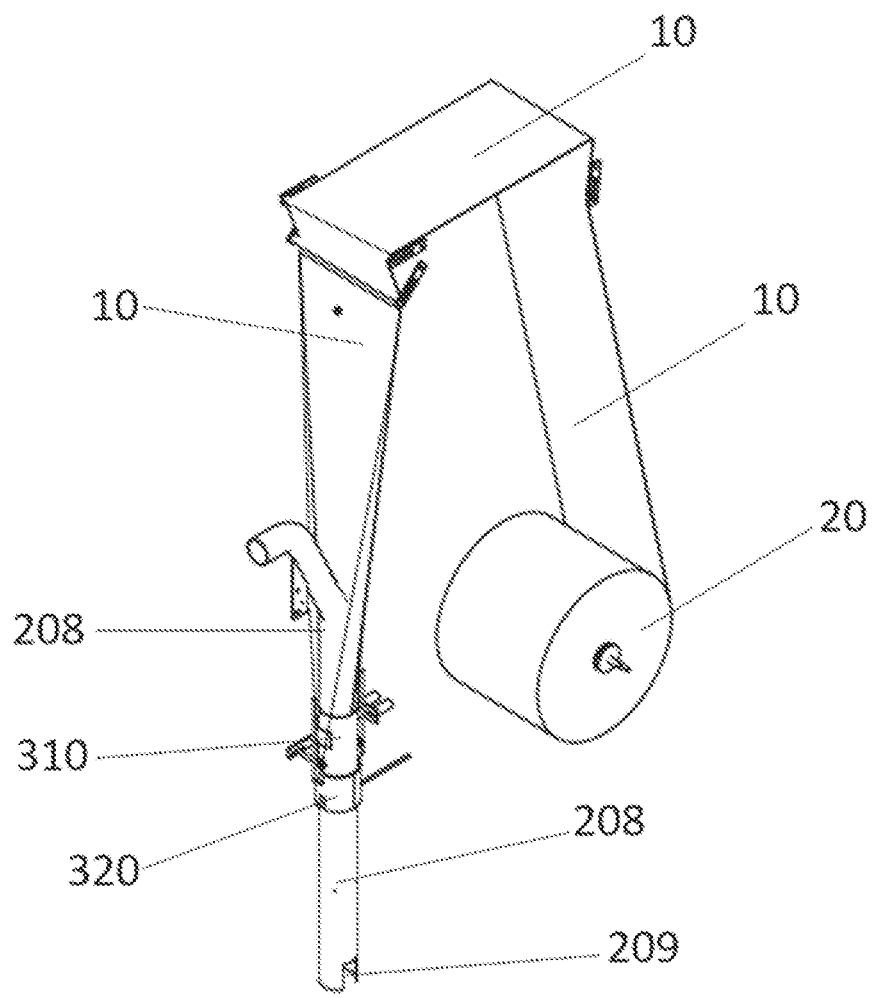

(51) Int. Cl.
*A01G 9/08* (2006.01)
*B65B 9/20* (2012.01)
*B65B 9/213* (2012.01)
*B65B 41/16* (2006.01)
*B65B 51/30* (2006.01)

(52) U.S. Cl.
CPC ............ *B65B 9/2056* (2013.01); *B65B 9/213* (2013.01); *B65B 37/005* (2013.01); *B65B 41/16* (2013.01); *B65B 51/30* (2013.01)

(58) Field of Classification Search
CPC ......... B65B 37/14; B65B 37/16; B65B 39/04; A01G 9/081; A01G 9/029; A01G 9/0291; A01G 24/50; A01G 24/60
USPC .......................... 53/545, 548, 551, 574, 575
See application file for complete search history.

(56) References Cited

U.S. PATENT DOCUMENTS

| | | | |
|---|---|---|---|
| 3,925,963 A | | 12/1975 | Greenawalt et al. |
| 4,056,132 A | * | 11/1977 | Decrane ................. B65B 39/04 |
| | | | 141/285 |
| 4,079,662 A | * | 3/1978 | Puccetti et al. ......... B65B 9/213 |
| | | | 493/203 |
| 4,117,649 A | * | 10/1978 | Egli .......................... B65B 1/02 |
| | | | 493/255 |
| 4,798,039 A | * | 1/1989 | Deglise ................. B65B 31/024 |
| | | | 53/469 |
| 6,116,001 A | * | 9/2000 | Kammler et al. ........ B65B 9/20 |
| | | | 53/551 |
| 2006/0285781 A1 | | 12/2006 | Zoss |
| 2009/0236035 A1 | | 9/2009 | Wimer |

FOREIGN PATENT DOCUMENTS

| | | | |
|---|---|---|---|
| EP | 3378793 A1 | | 9/2018 |
| GB | 1545554 A | | 5/1979 |
| JP | 2002153138 A | * | 5/2002 |
| JP | 2004267141 A | * | 9/2004 |
| SE | 337957 B | | 8/1971 |
| SE | 414989 B | | 9/1980 |
| WO | WO-9203914 A1 | | 3/1992 |
| WO | WO-2004/039145 A1 | | 5/2004 |
| WO | WO-2013/174386 A1 | | 11/2013 |
| WO | WO-2015/067272 A1 | | 5/2015 |
| WO | WO-2017/086038 A1 | | 5/2017 |

* cited by examiner

APPARATUS FOR LINE PRODUCTION OF PLANT GROWTH MEDIUM POTS OR BAGS

RELATED APPLICATIONS

This application is a national stage filing under 35 U.S.C. 371 of International Application No. PCT/EP2019/070629, filed Jul. 31, 2019, which claims priority to Denmark Application No. PA 2018 00453, filed Aug. 10, 2018. The entire teachings of said applications are incorporated by reference herein.

TECHNICAL FIELD OF THE INVENTION

The present invention relates to the production of growth medium pots or bags.

BACKGROUND OF THE INVENTION

Today, most of the greenhouses and nurseries applying hydroponic growth of herbs utilize injection moulded plastic pots. This is very problematic, as there is a dramatic increase of plastic waste in general in the world. Furthermore, when the herbs are harvested, the plastic pots are seldom separated from the root and growth medium, and both parts are therefore not recycled.

Another present issue is with the downsides of polythene seedling bags for trees and bushes in nurseries. In many countries, after transplanting, the bags are discarded, burned or buried on agricultural land. Bags discarded on farms can enter waterways and cause blockage and may also suffocate aquatic animals. Domestic and wild animals sometimes swallow them, with disastrous effects. The bags also serve as breeding sites for mosquitoes and other disease vectors. Burying the polythene bags in the soil interferes with proper water percolation and aeration of the soil and burning them produces noxious smoke. Hence, there is a need to find an alternative solution.

WO2013174386 discloses a method of manufacturing a plant receptacle, wherein the following steps are performed: a) a PLA thread is co-extruded with a flexible aliphatic polyester, said flexible aliphatic polyester comprising 10 wt % to 30 wt % bamboo material, such that the flexible aliphatic polyester covers the PLA thread, thereby creating a weldable biodegradable thread; b) using said weldable biodegradable thread in a woven or non-woven process, making a permeable sheet material; c) continuously forming said sheet material into a continuous receptacle, by bringing the side edges of said sheet material into contact and welding said side edges together; d) cutting said continuous receptacle in predetermined lengths thereby creating separate plant receptacles. Such plant receptacles are not suitable for hydroponic systems as the growth medium will fall out of the pot or bag and into the pot or bag trays of the hydroponic system, thereby obstructing filters and pumps.

SUMMARY OF THE INVENTION

It is an object of the present invention to provide an alternative growth medium pot or bag to replace the environmentally unfriendly injection moulded plastic pots or bags. Additionally, it is an object to provide a growth medium pot or bag suitable for hydroponic systems. Furthermore, it is an object to provide machinery for their production.

A first aspect relates to a process for line production of plant growth medium pots or bags with a closed bottom end comprising the steps of:
i) continuously folding the free end of a continuous length of water and air permeable sheet material, preferably supplied on a reel, into a (growing) sheet material tube around and beyond a free end of a growth medium feeding tube; ii) forming a first sealing in the sheet material tube by engaging and flattening the opposed walls of the sheet material tube at a position beyond the free end of the growth medium feeding tube;
iii) through the free end of the growth medium feeding tube, filling the sheet material tube with a measured amount (a dosage) of growth medium;
iv) forming a second sealing in the sheet material tube by engaging and flattening the opposed walls of the sheet material tube at a position above the position of the growth medium;
v) separating the part of the sheet material tube positioned downstream from the second sealing to form a first plant growth medium pot or bag with a closed end; and optionally
vi) repeating the steps i), and iii)-v) several times to form a plurality of plant growth medium pots or bags with a closed end.

The step ii) is an initiation step that is present to make a closed end in the sheet material tube. The tube will subsequently be closed due to the formation of the second sealing.

By using a water permeable sheet material, preferably biodegradable, woven or nonwoven, there is no need for the environmentally unfriendly injection moulded plastic pots or bags. Rather, the water permeable sheet material may be recycled together with the plant roots and growth medium in a composting facility. The sheet material must be water permeable in order for the produced plant pot or bag to be able to absorb water and dissolved nutrients. The growth medium pot or bag has a closed bottom end to avoid that growth medium will fall out of the pot or bag and into the pot or bag trays of the hydroponic system, thereby obstructing filters and pumps.

The term "biodegradable" as used herein describes the chemical dissolution of materials by bacteria or other biological means.

As used herein, the term "nonwoven sheet material" means a sheet material that has a structure of individual fibers or threads, which are interlaid, but not in an identifiable repeating manner. Nonwoven sheet materials may be formed by a variety of processes such as, for example, meltblowing processes, spunbonding processes, coforming processes, airlaying processes, wetlaying processes, and hydroentangling.

The fibers used for the water permeable sheet material are preferably biodegradable, which can be natural or synthetic fibers, e.g. cellulosic fibers, protein fibers or synthetic polymer fibers. Natural fibers can comprise pulped or shredded cellulose fibers, such as wood pulp, shredded wood, shredded paper (tissue, newsprint and the like), straw, cotton fiber, composted vegetation, fibrous sphagnum moss, peat moss, shredded stalks including shredded corn stalks and shredded pine straw (including needles, twigs, cones and small branches). Shredded vegetation is preferably dry before shredding. Protein fibers can e.g. be hair or gelatin. Biodegradable synthetic fibers can comprise reconstituted cellulose fibers, such as rayon fibers, vinyl polymer fibers, such as fibrous polyvinyl alcohol, poly lactic acid, and polyamide fibers.

The term "cellulosic fibers" as used herein describes fibers made from an organic compound derived primarily from plants such as trees.

The term "wood pulp fibers" as used herein describes a type of cellulosic fiber made from a lignocellulosic fibrous material prepared by chemically or mechanically separating cellulosic fiber from plants such as trees or cotton.

The term "regenerated/reconstituted cellulosic fibers" as used herein describes a type of cellulosic fiber made from wood pulp using a solvent fiber spinning process. The process involves dissolving wood pulp in a solvent and spinning the resultant spinning solution into fibers.

In one or more embodiments, the biodegradable and water permeable sheet material consist of spunlaced fibers without fiber binding materials. The term "spunlaced" as used herein refers to a structure of individual fibers or threads, which are physically entangled, without thermal bonding. Physical entanglement may be achieved using a water entanglement process, or alternatively, a needling process or a combination of both processes. The spunlaced fibers provide the strength to the water permeable sheet without the need for a binder, also, and very importantly for the present use, when the water permeable sheet is wet.

In order for the water permeable sheet material to be sealable, at least some of the fibers should preferably be made from, or coated with, a thermoplastic material. Alternatively, the water permeable sheet material could be coated with a hotmelt composition. Another method for sealing the sheet material tube may be to emboss or sew the sheet parts together.

In one or more embodiments, the water permeable sheet material is heat sealable.

In one or more embodiments, step i) comprises sealing the overlapping sheet side parts to one another.

In one or more embodiments, the water and air permeable sheet material comprises a) fibers coated with a thermoplastic material and/or b) fibers of a thermoplastic material; and wherein the sealings are made by heating.

In one or more embodiments, the step of continuously folding the free end of a continuous length of water and air permeable sheet material into a sheet material tube comprises sealing the overlapping sheet side parts to one another. Such a sealing is preferable a heat seal extending along the entire length of the sheet material tube. Such a seal may be provided by applying heat to the overlapping sheet side parts that overlay the free end of the growth medium feeding tube.

The water permeable sheet material must obviously be advanced during the continuous process. Different means may be used, such as a pair of jaws configured to move in the water permeable sheet material advancement direction during their engagement with the sheet material tube. In one or more embodiments, the continuous length of water and air permeable sheet material is advanced by grabbing the first sealing in the sheet material tube and pulling the first sealing further away from the free end of the growth medium feeding tube. The advantage of grabbing the first sealing is to avoid that the sheet material brakes during the pulling operation. Subsequently to separating the first sealing (to bottom in the first plant growth medium pot or bag) from the advancing growth medium feeding tube, the air permeable sheet material is advanced by grabbing the second sealing in the sheet material tube and pulling the second sealing further away from the free end of the growth medium feeding tube.

The pair of jaws may be welding jaws configured to make the sealings.

In one or more embodiments, the seals of the sheet material tube are air-cooled prior to the water permeable sheet material advancement operation. This configuration allows for faster production, as the sealings are strengthened rapidly.

A second aspect relates to an apparatus for use in the process of the present invention, the apparatus comprising:
- a storage container adapted for holding growth medium, and comprising a growth medium feeding tube; wherein the storage container is adapted for delivering dosages of growth medium through its growth medium feeding tube;
- means adapted for continuously folding the free end of a continuous length of water and air permeable sheet material, preferably supplied on a reel, into a sheet material tube around the growth medium feeding tube;
- a suction chamber adapted to be positioned around and beyond the free end of the growth medium feeding tube, and adapted to be in a) an open first configuration and b) in a closed second configuration; wherein when in the closed second configuration the suction chamber encloses the free end of the growth medium feeding tube and the sheet material tube formed around it, and engages and flattens the opposed walls of the sheet material tube at a predefined distance downstream from the free end of the growth medium feeding tube; and subsequently removes air out of the chamber, such that a dosage of growth medium in the storage container is transported through the growth medium feeding tube and into the sheet material tube within said suction chamber;
- a first sealing means adapted for forming a sealing in the sheet material tube by engaging and flattening the opposed walls of the open end of the sheet material tube at a position downstream to the suction chamber;
- wherein the free end of the growth medium feeding tube is configured with one or more perforations or slits extending through its walls; and
- cutting means adapted for separating a formed plant growth pot or bag from the continuous length of water permeable sheet material.

The cutting means may e.g. be a knife, a sharpened blade, or a laser beam.

In one or more embodiments, the first sealing means is integrated into the bottom part of the suction chamber.

In one or more embodiments, the sheet material tube is sealed along its length, e.g. by a lap sealing. In one or more embodiments, the apparatus further comprises a second sealing means adapted for heat sealing the overlapping sheet side parts of the sheet material tube to one another. In one or more embodiments, the apparatus further comprises a second sealing means adapted for lap sealing the sheet material tube. The sealing is preferably made on the tube part when it passes over the growth medium feeding tube. Thereby, a part of the free end of the growth medium feeding tube serves as a part of the sealing means. In one or more embodiments, a part of the free end of the growth medium feeding tube comprises a protrusion adapted for receiving a welding jaw.

In one or more embodiments, the storage container comprises:
- a storage compartment with an outlet in the bottom wall;
- a stirrer configured to maintain the growth medium homogeneous in the storage compartment; and
- an open-ended dosing chamber configured to move between a first position and a second position; wherein its first open end connects to the outlet of the storage compartment in the first position, and wherein its second open end connects to the inlet of the growth medium feeding tube in the second position. When the first open end disconnects from outlet of the storage container, it removes a dosage of growth medium from the storage container, through the open-ended dosing chamber, and into the growth medium feeding tube.

The storage container with a dosing chamber is a new way of thinking within the field of paper pots, where the growth medium is normally delivered into a cylindrical paper tube as a continuous mass (see e.g. WO1992003914). Such a configuration is not possible, when producing a plant pot or bag according to the present invention. In order to provide space for making the sealings, the growth medium must be provided into the cavity of the continuously formed sheet material tube. Therefore, the growth medium should be delivered in doses.

In one or more embodiments, the open-ended dosing chamber is configured as a block with a channel extending therethrough, and wherein the first open end of the channel connects to the outlet of the storage container in the first position, and wherein the second open end of the channel connects to the inlet of the growth medium feeding tube in the second position. In one or more embodiments, the block is slidingly engaged with the bottom wall of the of the storage container.

In one or more embodiments, the open-ended dosing chamber is slidingly engaged with bottom wall of the of the storage container.

In one or more embodiments, the stirrer is configured to change rotation direction each 2-10 dosing operations. This configuration is to avoid demixing of the growth medium.

In one or more embodiments, the stirrer paddle blade/head is configured as one or more cylindrical rods extending radially away from the stirrer shaft. This configuration is to avoid demixing of the growth medium.

In one or more embodiments, the apparatus further comprises a piston configured to move through the first and second open ends of the open-ended dosing chamber when the open-ended dosing chamber is in the second position.

A third aspect relates to a growth medium pot or bag obtainable by the process according to the present invention.

A fourth aspect relates to a growth medium pot or bag with a closed bottom end and an open top end, the growth medium pot or bag comprising a tubular sheet material surrounding a portion of growth medium; wherein the tubular sheet material is made of a single sheet of water and air permeable sheet material being sealed with two seals formed in said sheet material; wherein the first seal is a lap seal joining the two sides of the sheet material to form a tube; and wherein the second seal is formed in one of the ends of the tubular sheet material by engaging and flattening the opposed walls of the sheet material tube.

In one or more embodiments, the second seal is a tap seal.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

BRIEF DESCRIPTION OF THE FIGURES

FIG. 1 shows an apparatus for use in the process in accordance with various embodiments of the invention;

FIG. 2 shows a part of the storage container in accordance with various embodiments of the invention;

FIG. 3 shows an example of how to fold the sheet material into a tubular sheet material;

FIG. 4 shows the suction chamber relative to the free end of the growth medium feeding tube in accordance with various embodiments of the invention; and FIG. 5 shows parts of the apparatus for sealing, pulling, and cutting of the tubular sheet material.

DETAILED DESCRIPTION OF THE INVENTION

FIG. 1 shows an apparatus 100 for line production of plant growth medium pots or bags.

The apparatus comprises a storage container 200 with a growth medium feeding tube 208 (partly shown), folding means 300, a suction chamber 400 (shown in a closed position), and a first sealing means 500 (partly, only one of the two welding jaws may be seen).

The storage container 200 is here shown with two storage chambers, a first storage chamber 202 adapted for holding a large amount of growth medium, and a second storage chamber 204 for holding a relatively smaller amount of growth medium. Growth medium is transported from the first storage chamber 202 to the second storage chamber 204 by a conveyor belt 206. In FIG. 2, the second storage chamber 204 is shown relative to an open-ended dosing chamber 210. The open-ended dosing chamber 210 is configured to move between a first position and a second position with the aid of a pneumatic/hydraulic cylinder 212, as indicated by an arrow. A first open end 211 of the open-ended dosing chamber 210 connects to the outlet 205 of the second storage chamber 204 in the first position, and wherein the second open end 213 (not shown, but indicated by an arrow) connects to the inlet of the growth medium feeding tube 208 in the second position (here shown in the second position), while the first open end 211 disconnects from outlet 205 of the second storage chamber 204, thereby removing a dosage of growth medium from the second storage chamber 204, through the open-ended dosing chamber 210, and into the growth medium feeding tube 208. The storage container 200 further comprises a piston 220 configured to move through the first 211 and second 213 open ends of the open-ended dosing chamber 210 when the open-ended dosing chamber 210 is in the second position. This piston is not necessary when producing larger pots or bags. A stirrer paddle blade/head 230 is configured as two cylindrical rods extending radially away from the stirrer shaft. This configuration is to avoid demixing of the growth medium.

FIG. 3 shows an example of how to fold the sheet material into a tubular sheet material. The folding means 300 is adapted for continuously folding the free end of a continuous length of water and air permeable sheet material 10 supplied on a reel 20, into a sheet material tube (not shown) around the growth medium feeding tube 208. The folding means 300 is here shown comprising two ring- or tube-shaped units. The upper tube-shaped unit 310 is a guide means adapted for securing that one side of the sheet material 10 is continuously positioned below the other side of the sheet material 10 in order to position the sides relative to each other for a lap seal to be formed. The lower ring-shaped unit 320 is adapted to form the sheet material tube. Both units are positioned around the growth medium feeding tube 208 that thereby also aids in the folding operation. The free end of the growth medium feeding tube 208 is configured with two slits 209 (only one is shown) extending through its walls. The two slits secure that the part of the sheet material tube that extends beyond/below the free end of the growth medium feeding tube 208 will not collapse during the filling operation. Otherwise, the dosage of growth medium would not be able to be correctly positioned therein.

Figure 4:
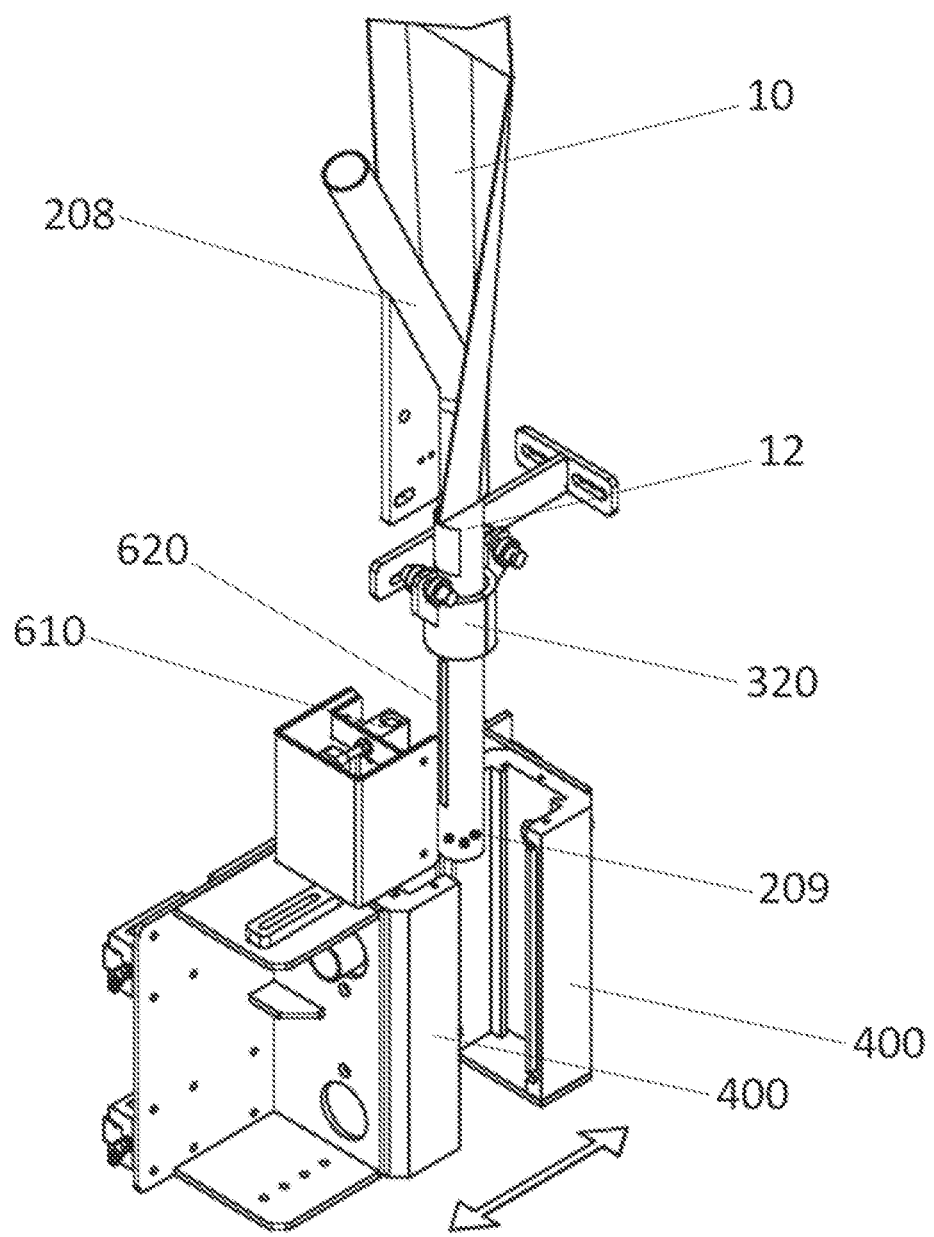

FIG. 4 shows the suction chamber 400 relative to the free end of the growth medium feeding tube 208 in accordance with various embodiments of the invention. The suction chamber 400 is positioned around and beyond the free end of the growth medium feeding tube 208, and adapted to be in a) an open first configuration (as shown) and b) in a closed second configuration. In the closed second configuration, the suction chamber 400 encloses the free end of the growth medium feeding tube 208, and the sheet material tube (not shown) formed around it. Furthermore, it engages and flattens the opposed walls of the water and air permeable sheet material tube at a predefined distance downstream from the free end of the growth medium feeding tube 208; and subsequently removes air out of the chamber (e.g. by the aid of a pump as seen to the right side in FIG. 1), such that a dosage of growth medium in the dosing chamber 210 and/or in the growth medium feeding tube 208, is transported through the growth medium feeding tube 208 and into the sheet material tube within said suction chamber 400. The free end of the growth medium feeding tube 208 is configured with multiple perforations 209 (three are shown) extending through its walls. The perforations secure that the part of the sheet material tube that extends beyond/below the free end of the growth medium feeding tube 208 will not collapse during the filling operation. Otherwise, the dosage of growth medium would not be able to be correctly positioned therein. A second sealing means is configured for sealing the sheet material tube along its length, here a lap sealing. The lap sealing is made on the sheet material tube when it passes over the growth medium feeding tube. The second sealing means comprises a welding jaw 610, and wherein a part of the free end of the growth medium feeding tube comprises a protrusion 620 adapted for receiving said welding jaw 610. Thereby, a part of the free end of the growth medium feeding tube 208 serves as a part of the second sealing means.

Figure 5:
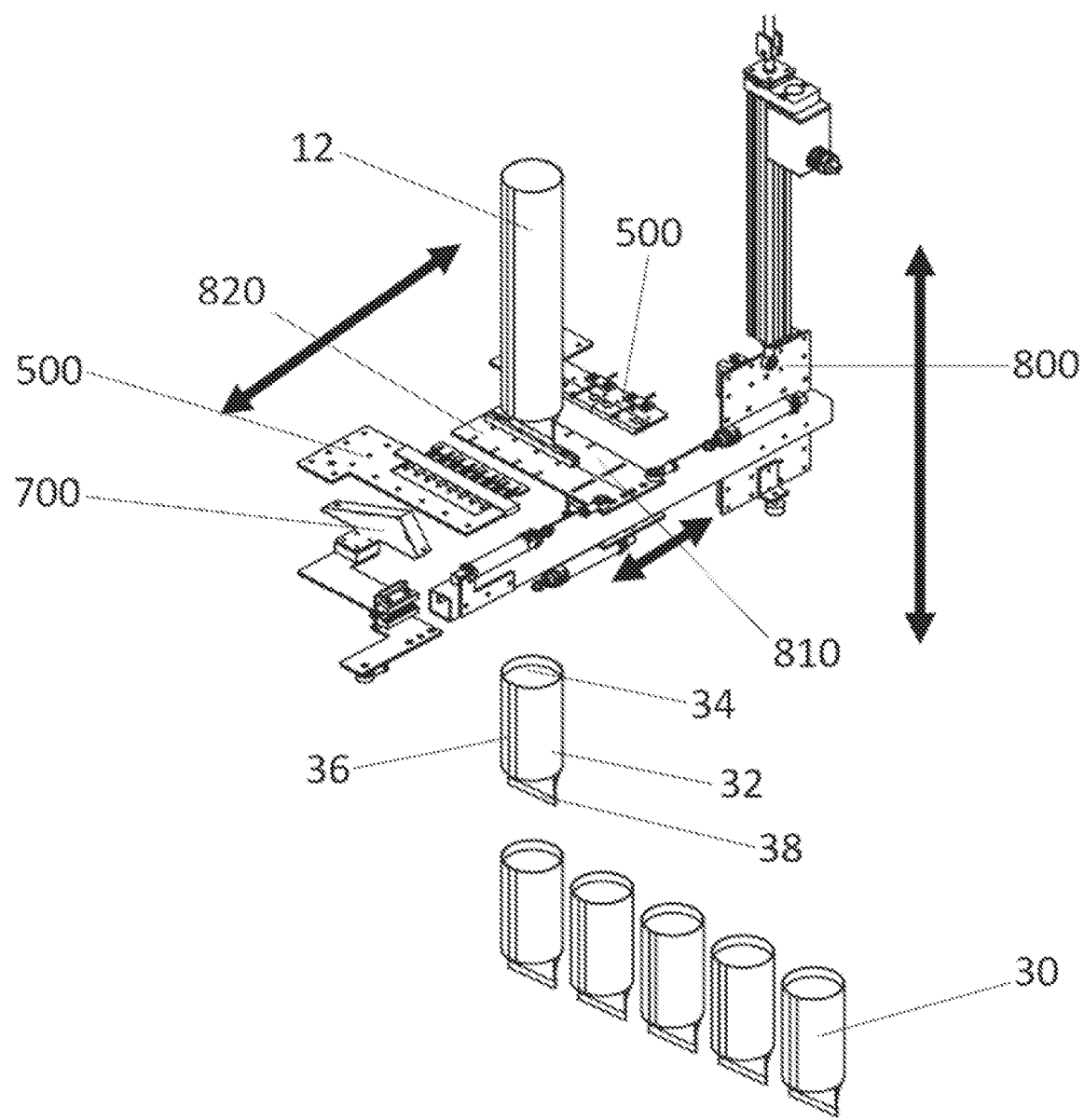

FIG. 5 shows parts of the apparatus for sealing, pulling, and cutting of the tubular sheet material. The first sealing means 500 (here configured as two welding jaws) is adapted for forming a sealing in the sheet material tube 12 by engaging and flattening the opposed walls of the open end of the sheet material tube 12 at a position downstream to the suction chamber (not shown). The sealing is performed while the suction chamber is in the closed second configuration. When the two welding jaws retract, the suction chamber moves to its open first configuration, and the continuous length of water and air permeable sheet material is advanced by grabbing and pulling means 800 configured for grabbing the formed sealing in the sheet material tube and pulling the sealing further away from the free end of the growth medium feeding tube (not shown). The advantage of grabbing the sealing is to avoid that the sheet material breaks during the pulling operation. The grabbing and pulling means 800 is here shown comprising two jaws 810, 820 adapted for grabbing the sealing. The jaws 810, 820 are shown grabbing the sealing, while the two welding jaws are in a retracted position.

A cutting means 700 is also shown in a retracted position. The cutting means is adapted for separating the formed plant growth pot or bag 30 from the continuous length of water permeable sheet material. The cutting operation is performed subsequently to the pulling operation.

An example of a growth medium pot or bag 30 produced by the process of the present invention is also shown in FIG. 5. Typical pots or bags prepared by the present invention have a diameter of 20-200 mm, and a height of 20-500 mm. The growth medium pot or bag 30 has a closed bottom end and an open top end and comprises a tubular sheet material 32 surrounding a portion of growth medium 34. The tubular sheet material is made of a single sheet of water and air permeable sheet material being sealed with two seals formed in said sheet material. The first seal is a lap seal 36 joining the two sides of the sheet material to form a tube. The second seal 38 (a tap seal) is formed in one of the ends of the tubular sheet material by engaging and flattening the opposed walls of the sheet material tube.

REFERENCES

10 Water permeable sheet material
12 Sheet material tube
20 Reel
30 Plant growth pot or bag
32 Tubular sheet material
34 Growth medium
36 Lap seal
38 Seal
100 Apparatus
200 Storage container
202 First storage chamber
204 Second storage chamber
205 Outlet
206 Conveyor belt
208 Growth medium feeding tube
209 Perforation or slit
210 Dosing chamber
211 First open end
212 Pneumatic/hydraulic cylinder
213 Second open end
220 Piston
230 Stirrer paddle blade/head
300 Folding means
310 Upper unit
320 Lower unit
400 Suction chamber
500 First sealing means
610 Welding jaw/second sealing means
620 Protrusion
700 Cutting means
800 Grabbing and pulling means
810 Jaw
820 Jaw

The invention claimed is:

1. An apparatus (100) for line production of plant growth medium pots or bags (30) each with a closed bottom end and an open top end, the apparatus comprising:
   a storage container (200) adapted for holding growth medium, and comprising a growth medium feeding tube (208) with a free end; wherein the storage container (200) is adapted for delivering dosages of growth medium through the growth medium feeding tube (208);
   folding means (300) adapted for continuously folding a free end of a continuous length of water and air permeable sheet material (10), supplied on a reel (20), into a sheet material tube (12) around the growth medium feeding tube (208);

a suction chamber (400) adapted to be positioned around and beyond the free end of the growth medium feeding tube (208), and adapted to be in a) an open first configuration and b) in a closed second configuration; wherein when in the closed second configuration the suction chamber (400) encloses the free end of the growth medium feeding tube (208) and the sheet material tube formed around the growth medium feeding tube (208), and engages and flattens opposed walls of the sheet material tube at a predefined distance downstream from the free end of the growth medium feeding tube (208); and subsequently removes air out of the suction chamber (400), such that a dosage of growth medium in the storage container (200) is transported through the growth medium feeding tube (208) and into the sheet material tube within said suction chamber (400);

a first sealing means (500) adapted for forming a sealing in the sheet material tube by engaging and flattening the opposed walls of the open end of the sheet material tube at a position downstream to the suction chamber (400);

wherein the free end of the growth medium feeding tube (208) is configured with one or more perforations or slits (209) extending through its the growth medium feeding tube's walls; and cutting means (700) adapted for separating a formed plant growth pot or bag (30) from the continuous length of water permeable sheet material (10) by cutting downstream from the sealing to form a plant growth pot or bag (30) with an open top end and a closed bottom end.

2. The apparatus (100) according to claim 1, further comprising a second sealing means (610) adapted for lap sealing the sheet material tube.

3. The apparatus (100) according to claim 2, wherein the second sealing means (610) comprises a welding jaw (610), and wherein a part of the free end of the growth medium feeding tube (208) comprises a protrusion (620) adapted for receiving said welding jaw (610).

* * * * *